(12) United States Patent
Jain et al.

(10) Patent No.: US 12,380,115 B1
(45) Date of Patent: Aug. 5, 2025

(54) SYSTEMS AND METHODS FOR PROVIDING ADVANCED PERSONALIZATION IN QUERY SYSTEMS

(71) Applicant: INTUIT INC., Mountain View, CA (US)

(72) Inventors: Siddharth Jain, Mountain View, CA (US); Venkat Narayan Vedam, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/651,596

(22) Filed: Apr. 30, 2024

(51) Int. Cl.
*G06F 16/2457* (2019.01)
*G06F 16/2453* (2019.01)

(52) U.S. Cl.
CPC .. *G06F 16/24575* (2019.01); *G06F 16/24539* (2019.01); *G06F 16/24578* (2019.01)

(58) Field of Classification Search
CPC ......... G06F 16/24575; G06F 16/24539; G06F 16/24578
See application file for complete search history.

(56) References Cited

U.S. PATENT DOCUMENTS

| | | | |
|---|---|---|---|
| 6,493,688 B1* | 12/2002 | Das | H04N 21/4755 |
| | | | 715/721 |
| 11,526,801 B2* | 12/2022 | Scott, II | G06N 5/02 |
| 12,182,678 B1* | 12/2024 | Poulis | G06N 3/045 |
| 2024/0045990 A1* | 2/2024 | Boyer | G06F 40/279 |
| 2024/0232207 A9* | 7/2024 | Bierner | G06F 40/30 |
| 2024/0320251 A1* | 9/2024 | Hemington | G06F 16/338 |
| 2024/0394151 A1* | 11/2024 | Frese | G06F 11/1469 |

* cited by examiner

*Primary Examiner* — Etienne P Leroux
(74) *Attorney, Agent, or Firm* — DLA PIPER LLP US

(57) ABSTRACT

Systems and methods are provided for providing advanced personalization in query systems.

20 Claims, 6 Drawing Sheets

SYSTEMS AND METHODS FOR PROVIDING ADVANCED PERSONALIZATION IN QUERY SYSTEMS

BACKGROUND OF THE DISCLOSURE

Generally, conventional query systems provide static responses to users in response to their questions. However, such static responses often lack in quality, relevance, and personalization. In particular, traditional query systems used by, for example, developers often fail to offer recommendations that align closely with individual developer preferences, expertise, current context, and similar topics among peers. This can lead to inefficient and ineffective information retrieval for the developers, which is undesirable.

The drawings are not necessarily to scale, or inclusive of all elements of a system, emphasis instead generally being placed upon illustrating the concepts, structures, and techniques sought to be protected herein.

DESCRIPTION

The following detailed description is merely exemplary in nature and is not intended to limit the claimed invention or the applications of its use.

Embodiments of the present disclosure relate to systems and methods for providing advanced personalization in query systems. In particular, the disclosed principles integrate dynamic user profiling and advanced data analytics to personalize query responses that adapt to individual user behaviors and preferences. For example, the disclosed system can leverage collaborative filtering, a sophisticated knowledge graph, and large language models (LLMs) to provide query responses and continuously refine user profiles. By analyzing user queries, selections, and feedback, the system can adapt to each unique user profile and preferences, thus providing more relevant and personalized recommendations. The disclosed system can therefore also evolve in real-time based on continuous user interaction and generally can offer a significant leap in the realm of query tools that offers a more intuitive and efficient search experience.

Figure 1:
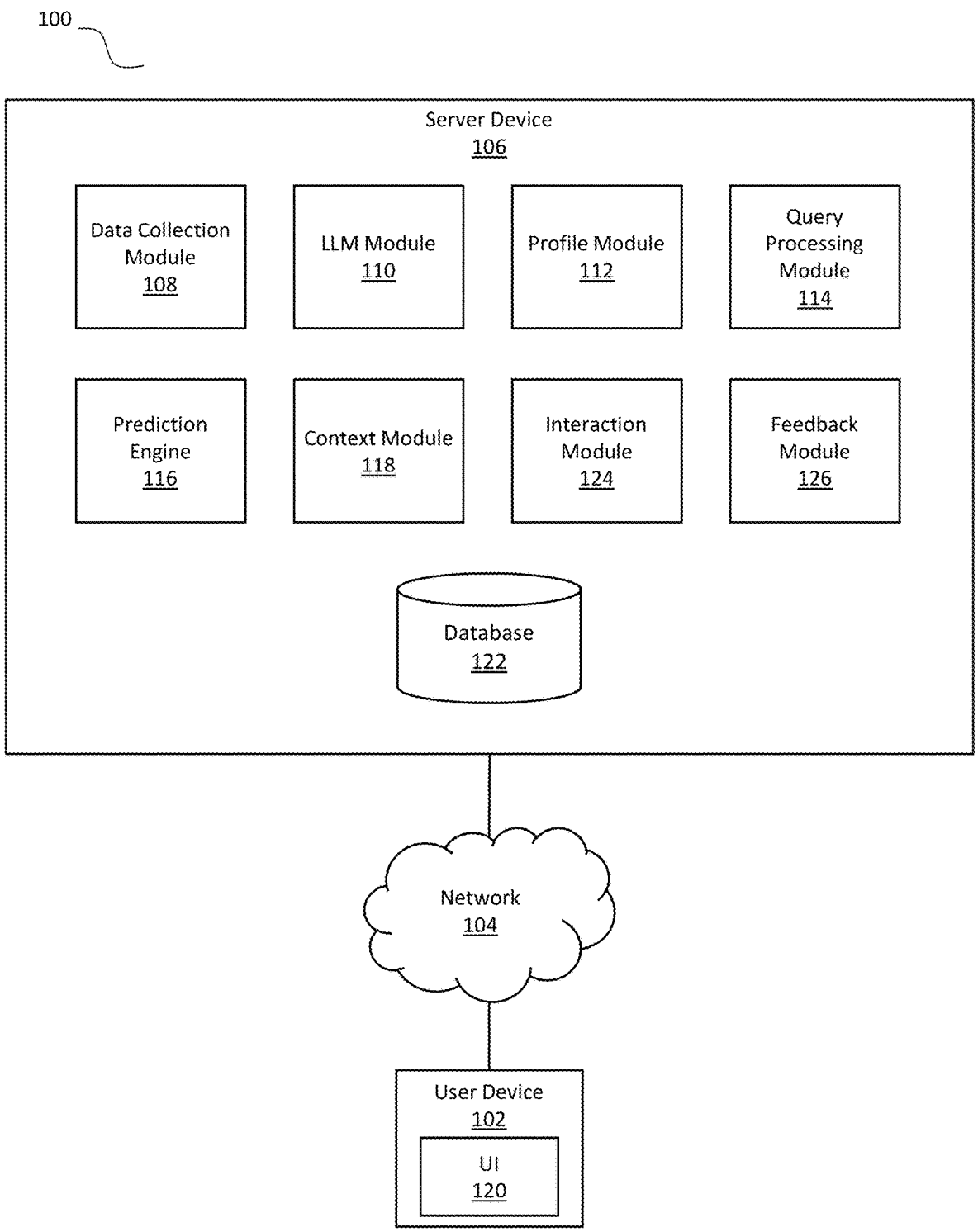
FIG. 1 is a block diagram of an example system for providing advanced personalization in query systems according to example embodiments of the present disclosure.

FIG. 1 is a block diagram of an example system 100 for providing advanced personalization in query systems according to example embodiments of the present disclosure. The system 100 can include one or more user devices 102 (generally referred to herein as a "user device 102" or collectively referred to herein as "user devices 102") that can access, via network 104, a query system managed by a server device 106. This connection enables a user (e.g., a developer) operating the user device 102 to utilize a user interface (UI) 120 to consult the query system on the server 106. For example, the user can transmit a query or question via the UI 120 that is transmitted to the server 106 for analysis. The server 106, via its various modules, generates a response and transmits it back to the user device 102 for display to the user. For example, the query system could be a part of various online services, such as a developer assist tool. In some embodiments, the system 100 can include any number of user devices 102.

A user device 102 can include one or more computing devices capable of receiving user input, transmitting and/or receiving data via the network 104, and or communicating with the server 106. In some embodiments, a user device 102 can be a conventional computer system, such as a desktop or laptop computer. Alternatively, a user device 102 can be a device having computer functionality, such as a personal digital assistant (PDA), a mobile telephone, a smartphone, tablet, or other suitable device. In some embodiments, a user device 102 can be the same as or similar to the computing device 500 described below with respect to FIG. 5.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 400 described below in the context of FIG. 4.

As shown in FIG. 1, the server 106 includes a data collection module 108, an LLM module 110, a profile module 112, a query processing module 114, a prediction engine 116, a context module 118, an interaction module 124, and a feedback module 126. The server 106 can also include a database 122 that is configured to store and maintain user profile information (e.g., a knowledge graph), as well as various other information, such as historical queries, interaction data, feedback data, documentation, forum threads, code snippets, and other relevant materials.

In some embodiments, the data collection module 108 is configured to systematically gather data including user queries, selections, and feedback (e.g., thumbs up/down) from the various users within the system 100. For example, there may be a large team of developers that utilize the system 100 (via their respective user devices 102) to access the query system to get answers to questions.

In some embodiments, the LLM module 110 includes an LLM, such as GPT-3, -3.5, -4, PaLM, Ernie Bot, LLaMa, and others. In some embodiments, an LLM can include various transformed-based models trained on vast corpuses of data that utilize an underlying neural network. The LLM module 110 can receive an input, such as a combination of data associated with a user query (discussed in relation to FIG. 2A). The LLM module 110 is configured to analyze the input and generate one or more tuning parameters for updating a user profile. In addition, the LLM module 110 is configured to receive updated LLM contexts with improved personalized recommendations for a user query and generate final recommendations for display therefrom. Additional details on the processing performed by the LLM module 110 is discussed in relation to FIGS. 2A and 2B.

In some embodiments, the profile module 112 is configured to construct dynamic user profiles for the various users utilizing the system 100. For example, the profile module 112 can use advanced knowledge graphs to reflect each user's technical expertise, preferred technologies, and historical interaction patterns. In addition, the profile module 112 is configured to update the associated user profile based on the current user query, for example after it has been analyzed and processed by the query processing module 114, as discussed below.

In some embodiments, the query processing module 114 is configured to receive user queries from the user device 102. In addition, the query processing module 114 is configured to process a received query via various natural language processing techniques to understand the context and intent of the query. Further, the query processing module 114 is configured to match the received query against a database of resources. The matching can be performed via various techniques, such as e.g., semantic/hybrid searching.

In some embodiments, the prediction engine 116 is configured to analyze the current user profile associated with a user query. In addition, the prediction engine 116 is configured to bias the current user profile and tailor its predictions based on similar users. For example, the prediction engine 116 can analyze the various user profiles contained within the knowledge graph to identify users with profiles similar to the user associated with the received user query. In addition, the prediction engine 116 is configured to generate personalized query suggestions and relevant resource recommendations based on a user query and profile. For example, in some embodiments, the prediction engine 116 can use collaborative filtering and matrix factorization techniques to generate such suggestions. In addition, the prediction engine 116 is configured to rank the generated recommendations based on a predicted relevance to the user's profile and the specific query context.

In some embodiments, the context module 118 is configured to update the context provided to the LLM module 110 and provide it as an input to the LLM module 110 once it has been updated. For example, the context module 118 can update the LLM context with the recommendations generated by the prediction engine 116 and the updated user profile.

In some embodiments, the interaction module 124 is configured to receive interaction data for final recommendations that are displayed to the user via UI 120. For example, the interaction module 124 can monitor the recommendations displayed on the UI 120 of the user device 102 and detect various interactions, such as when the user follows links, opens and reads documents, or utilizes suggested code snippets.

In some embodiments, the feedback module 126 is configured to cause a feedback option to be displayed on the user device 102 via the UI 120. For example, the feedback module 126 can display a feedback option that includes one or more of options to upvote or downvote (i.e., thumbs up or thumbs down) or to provide textual feedback. In addition, the feedback module 126 is configured to receive feedback data based on the user's feedback submissions via the UI 120.

The modules described herein (e.g., data collection module 108, LLM module 110, etc.) may be implemented as software components executed by the respective devices within the system 100. The user interface device 102, server device 106, and database 122 operate by executing software instructions that embody the functionalities of the system 100. These software modules are responsible for carrying out the various steps of the advanced personalization process, including but not limited to, data collection, LLM context creation, profile tuning, personalized recommendation generation, etc. The software-driven nature of these modules allows for a flexible and scalable system that can be updated or modified to meet evolving classification requirements or to incorporate new technologies as they become available.

Figure 2A:
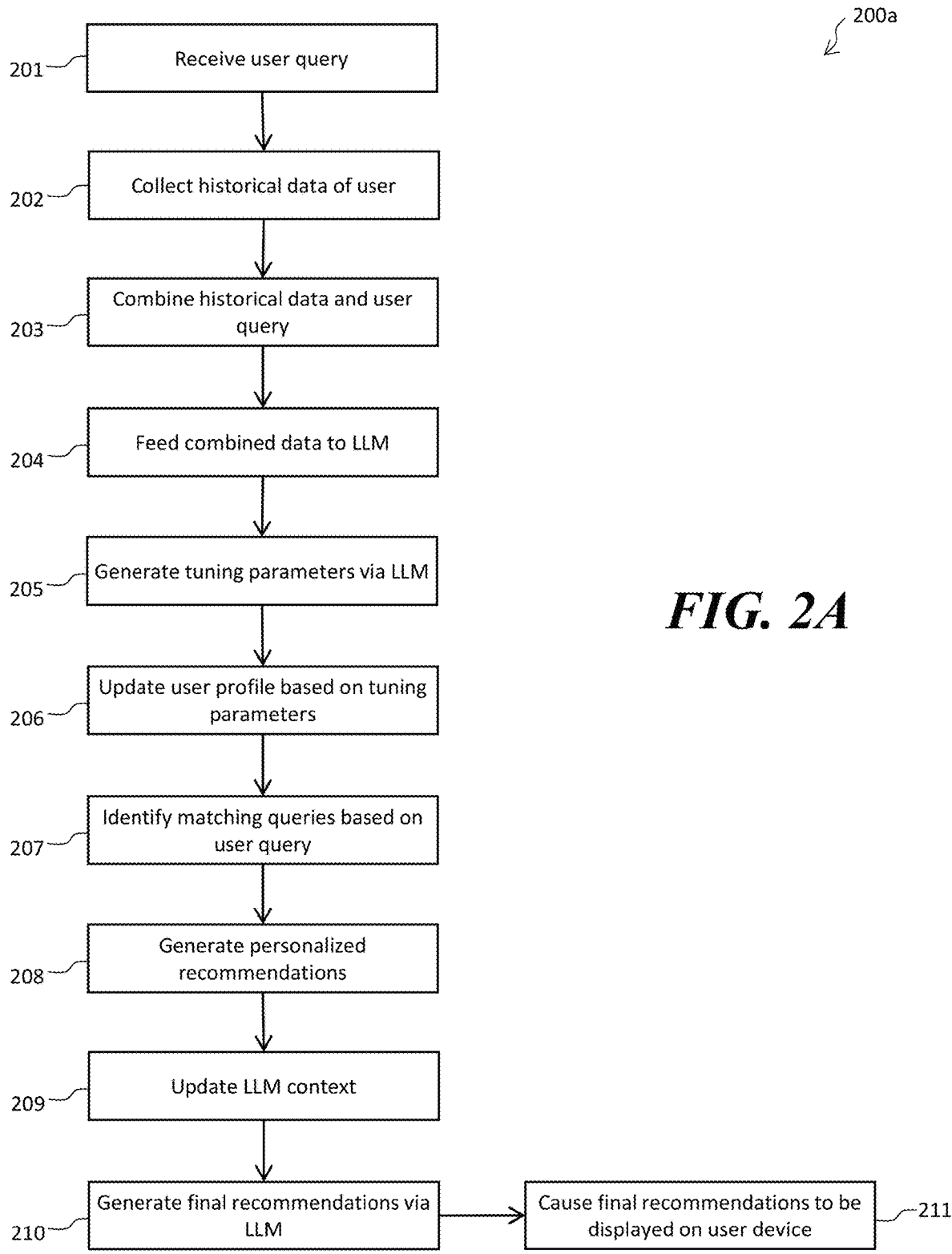
FIGS. 2A and 2B are flowcharts of example processes for providing advanced personalization in query systems according to example embodiments of the present disclosure.

FIG. 2A is a flowchart of an example process 200A for providing advanced personalization in query systems according to example embodiments of the present disclosure. In some embodiments, the process 200A can be performed by the server 106 in conjunction with a user, via user device 102, accessing a query system to present a query. For example, a user may have an interface executing on the user device 102 via UI 120 where he/she will type a question and submit it to the server 106.

At block 201, the query processing module 114 receives a user query from the user device 102. In some embodiments, the query can include a specific question, a request for documentation or code examples, or general guidance, although these are not limiting and are merely exemplary in nature. At block 202, the data collection module 108 collects historical data associated with the user who sent the query. In some embodiments, the historical data can include past queries, interactions with the system, and feedback that the user has provided about previously received responses. In some embodiments, the historical data can be obtained from the database 122. In addition, the data collection module 108 can include the current user profile (i.e., the knowledge graph of the current user). At block 203, the data collection module 108 combines the historical data obtained from the database 122 with the received user query into a context that can be provide to an LLM, such as the LLM module 110.

At block 204, the context module 118 feeds the context (that comprises the user query and the historical data associated with the user) to the LLM module 110. At block 205, the LLM module generates one or more tuning parameters by analyzing the context it has been fed. In some embodiments, the LLM module 110 analyzes the combined data (i.e., the user query and the historical data of the user) to understand the user's preferences, expertise level, and potential topics of interest. The LLM module 110 can, based on this information, generate inferred preferences, expertise areas, and any patterns in the types of queries and resources the user interacts with (i.e., a "query pattern" or a "resource use pattern"). This inferred information is referred to as tuning parameters, which are output by the LLM module 110. At block 206, the profile module 112 updates the user's profile with the tuning parameters generated by the LLM module 110.

At block 207, the query processing module 114 identifies matching queries based on the received user query. In some embodiments, identifying matching queries can include querying the database 122 with the received query to identify similar or exact queries. The querying can be performed via various techniques such as, for example, a semantic/hybrid search. In some embodiments, once matching queries have been identified, the users that submitted those matching queries can also be marked by the query processing module 114 and added to the context.

At block 208, the prediction engine 116 generates personalized recommendations (i.e., final responses) for responding to the user query. In some embodiments, the prediction engine 116 can use collaborative filtering and matrix factorization techniques to generate these suggestions. In some embodiments, the prediction engine 116 is configured to perform a similarity assessment to quantify similarities between users based on their interaction histories. Additional details regarding generating personalized recommendations are discussed in relation to process 300 of FIG. 3.

At block 209, the context module 118 updates the LLM context with the personalized recommendations generated at block 208. In addition, the context module 118 can update the LLM context with the updated user profile generated by the prediction engine 116. At block 210, the LLM module 110 generates final recommendations based on the updated context. At block 211, the server 106 causes the final recommendations (i.e., responses to the user's original query) to be displayed on the user device 102 via the UI 120. In some embodiments, the final recommendations can be displayed in the form of a list of suggested queries, a ranked list of resources, or direct answers to the query itself. In some embodiments, alongside the recommendations, the server 106 can provide confidence scores and or explanations regarding why each item was suggested.

Figure 2B:
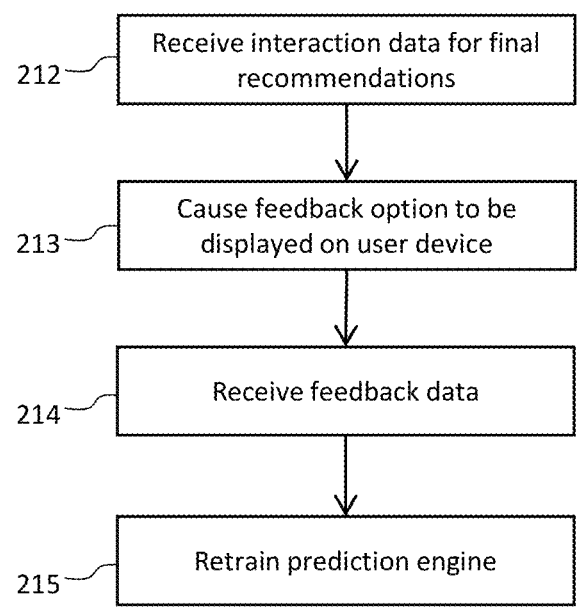

FIG. 2B is a flowchart of an example process 200B for providing advanced personalization in query systems according to example embodiments of the present disclosure. In some embodiments, the process 200B can be performed by the server 106 in conjunction with a user, via user device 102, accessing a query system to present a query. For example, a user may have an interface executing on the user device 102 via UI 120 where he/she will type a question and submit it to the server 106. Process 200B can be performed after the completion of process 200A.

At block 212, the interaction module 124 receives interaction data for the final recommendations. The interaction module 124 can monitor the recommendations displayed on the UI 120 of the user device 102 and detect various interactions, such as when the user follows links, opens and reads documents, or utilizes suggested code snippets. At block 213, the feedback module 126 causes a feedback option to be displayed on the user device 102 via the UI 120. In some embodiments, the feedback option can include one or more of options to upvote or downvote (i.e., thumbs up or thumbs down) or to provide textual feedback. At block 214, the feedback module 126 receives feedback data based on the user's feedback submissions via the UI 120.

At block 215, the server 106 can retrain the prediction engine 116 based on the received interaction and feedback data. In some embodiments, the retraining can be used to further refine and improve the recommendation algorithms within the prediction engine 116. In some embodiments, such a feedback loop can allow the system to learn from each interaction, which can progressively enhance the accuracy and relevance of future recommendations. In addition, the user's profile and the system's recommendation logic can be continuously updated based on ongoing interactions and feedback, thus becoming more attuned to specific user preferences and needs.

Figure 3:
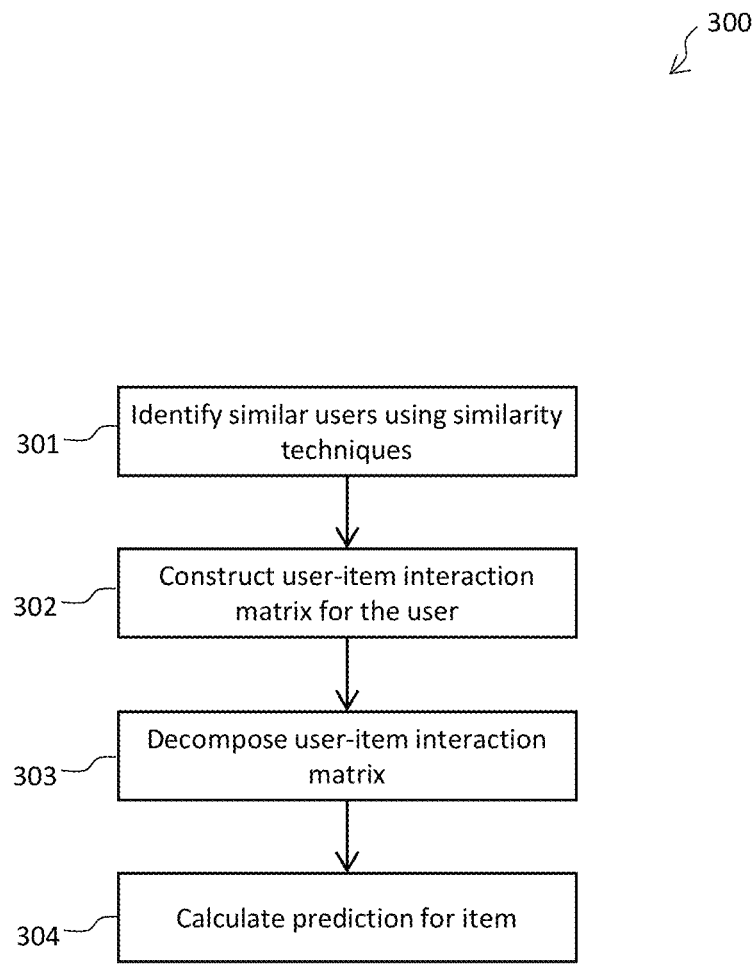
FIG. 3 is a flowchart of an example process for generating personalized recommendations according to an embodiment of the present disclosure.

FIG. 3 is a flowchart of an example process 300 for generating personalized recommendations according to an embodiment of the present disclosure. In some embodiments, the process 300 can be performed at block 208 of process 200A in FIG. 2A. In addition, the process 300 can be performed by the prediction engine 116, where similarity analysis and matrix factorization techniques are used to generate recommendations in response to the user query.

At block 301, the prediction engine 116 identifies similar users via one or more various similarity techniques. For example, the prediction engine 116 can employ various similarity techniques to identify similar users, such as a cosine similarity technique, a Pearson correlation, L2 similarity, Jaccard similarity, or a K nearest neighbors (KNN) technique. In some embodiments, the cosine similarity technique can involve calculating the cosine of the angle between two users' interaction vectors in a multi-dimensional space, and this value can serve as an indicator of behavioral similarity. In some embodiments, behavioral similarity can include actions such as queries and feedback provided. In some embodiments, the cosine similarity value can be calculated as follows in Equation (1).

$$\text{Similarity}(u, v) = \frac{\sum (R_u - \overline{R_u}) \cdot (R_v \cdot \overline{R_v})}{\sqrt{\sum (R_u - \overline{R_u})^2} \cdot \sqrt{\sum (R_v \cdot \overline{R_v})^2}} \quad (1)$$

In Equation (1), $R_u$ and $R_v$ represent the interaction vectors for users u and v. In some embodiments, each element in these vectors represents a user's interaction with a particular item, such as a query or a document. For instance, this could include the frequency of queries, the time spent on a document, or the ratings given to a document. In addition, the barred $R_u$ and $R_v$ values (i.e., $\overline{R_u}$ and $\overline{R_v}$) represent the average of the elements in the interaction vectors for users u and v, respectively. In some embodiments, the numerator can measure the extent to which users u and v behave similarly, summing the product of the differences of each interaction from their respective averages. In some embodiments, the denominator can normalize the similarity measure and ensure that the value is between −1 and 1, where 1 can indicate perfect similarity, −1 can indicate dissimilarity, and 0 can represent no correlation.

At block 302, the prediction engine 116 identifies a user-item interaction matrix for the user associated with the query and, at block 303, the prediction engine decomposes the user-item interaction matrix. In other words, the prediction engine 116 can utilize a matrix factorization technique to predict user preferences with better accuracy. For example, the prediction engine can incorporate specialized latent factors relevant to specific industries of the user base. In the case of software development, the latent factors can include coding languages, frameworks, and developer skill levels. In some embodiments, the matrix factorization technique can decompose a large user-item interaction matrix into two or more smaller matrices that represent latent features of users and items. In other words, the matrix factorization can be used to predict how a user might rate or interact with an item based on their past behavior. The disclosed matrix factorization technique can be represented by Equation (2) below.

$$\widehat{r_{ui}} = \mu + b_u + b_i + q_i^T \cdot p_u \quad (2)$$

In Equation (2), $r_{ui}$ hat (i.e., $\widehat{r_{ui}}$) can represent the predicted interaction or rating of the user u for item i. In other words, this value can be what the system believes the user's preference will be. In addition, μ can present the global average interaction or rating across all users and items and can serve as a baseline; $b_u$ can represent bias terms for user u and item i, which can capture the tendency of users to rate items higher or lower than the average user; $b_i$ can represent whether item i is generally rated higher or lower than other items; and the q and p terms can represent latent factors that are characteristics of items and user that are inferred from their interaction patterns. For example, in the context of document retrieval, latent factors for documents might include topics or difficulty levels, while latent factors for users could include interests or expertise areas. Finally, the dot product between the q and p terms can represent the interaction between user preferences and item characteristics. Equation (2) can combine a general baseline (global average), adjustments for specific user and item tendencies (biases), and the interaction of inferred user preferences and item characteristics (latent factors) to predict a user's interaction with an item. In some embodiments, a Stochastic Gradient Descent technique can be used to minimize the objective function.

At block 304, the prediction engine 116 calculates a prediction for specific items. In some embodiments, this can include ranking the generated recommendations based on a predicted relevance to the user's profile and the query context. In addition, the prediction engine 116 can identify specific entries from the decomposed matrices with high predicted interactions or ratings.

Figure 4:
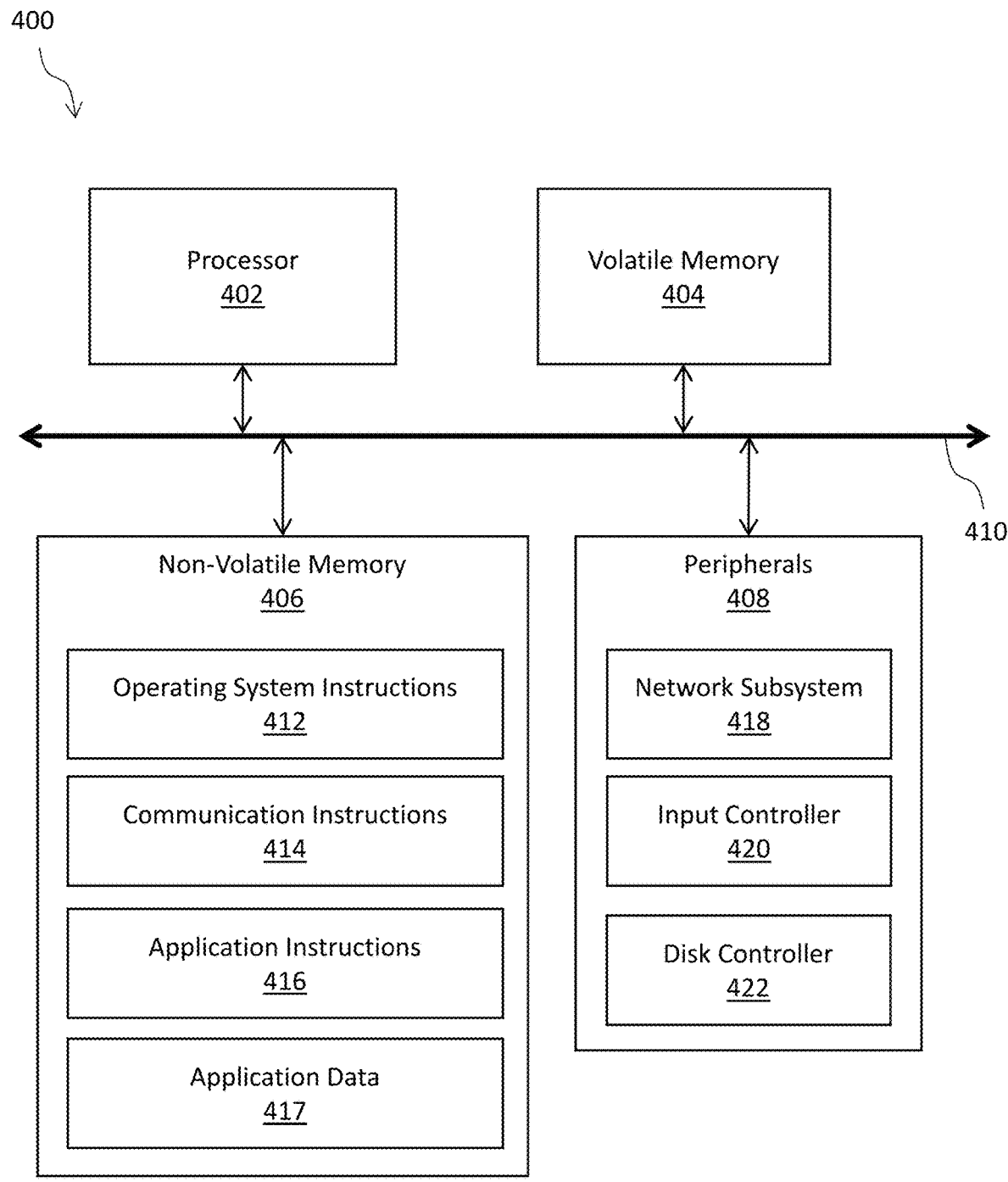
FIG. 4 is server device that can be used within the system of FIG. 1 according to an embodiment of the present disclosure.

FIG. 4 is a diagram of an example server device 400 that can be used within system 100 of FIG. 1. Server device 400 can implement various features and processes as described herein. Server device 400 can be implemented on any electronic device that runs software applications derived from complied instructions, including without limitation personal computers, servers, smart phones, media players, electronic tablets, game consoles, email devices, etc. In some implementations, server device 400 can include one or more processors 402, volatile memory 404, non-volatile memory 406, and one or more peripherals 408. These components can be interconnected by one or more computer buses 410.

Processor(s) 402 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 410 can be any known internal or external bus technology, including but not limited to ISA, EISA, PCI, PCI Express, USB, Serial ATA, or FireWire. Volatile memory 404 can include, for example, SDRAM. Processor 402 can receive instructions and data from a read-only memory or a random access memory or both. Essential elements of a computer can include a processor for executing instructions and one or more memories for storing instructions and data.

Non-volatile memory 406 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 406 can store various computer instructions including operating system instructions 412, communication instructions 414, application instructions 416, and application data 417. Operating system instructions 412 can include instructions for implementing an operating system (e.g., Mac OS®, Windows®, or Linux). The operating system can be multi-user, multiprocessing, multitasking, multithreading, real-time, and the like. Communication instructions 414 can include network communications instructions, for example, software for implementing communication protocols, such as TCP/IP, HTTP, Ethernet, telephony, etc. Application instructions 416 can include instructions for various applications. Application data 417 can include data corresponding to the applications.

Peripherals 408 can be included within server device 400 or operatively coupled to communicate with server device 400. Peripherals 408 can include, for example, network subsystem 418, input controller 420, and disk controller 422. Network subsystem 418 can include, for example, an Ethernet of WiFi adapter. Input controller 420 can be any known input device technology, including but not limited to a keyboard (including a virtual keyboard), mouse, track ball, and touch-sensitive pad or display. Disk controller 422 can include one or more mass storage devices for storing data files; such devices include magnetic disks, such as internal hard disks and removable disks; magneto-optical disks; and optical disks.

Figure 5:
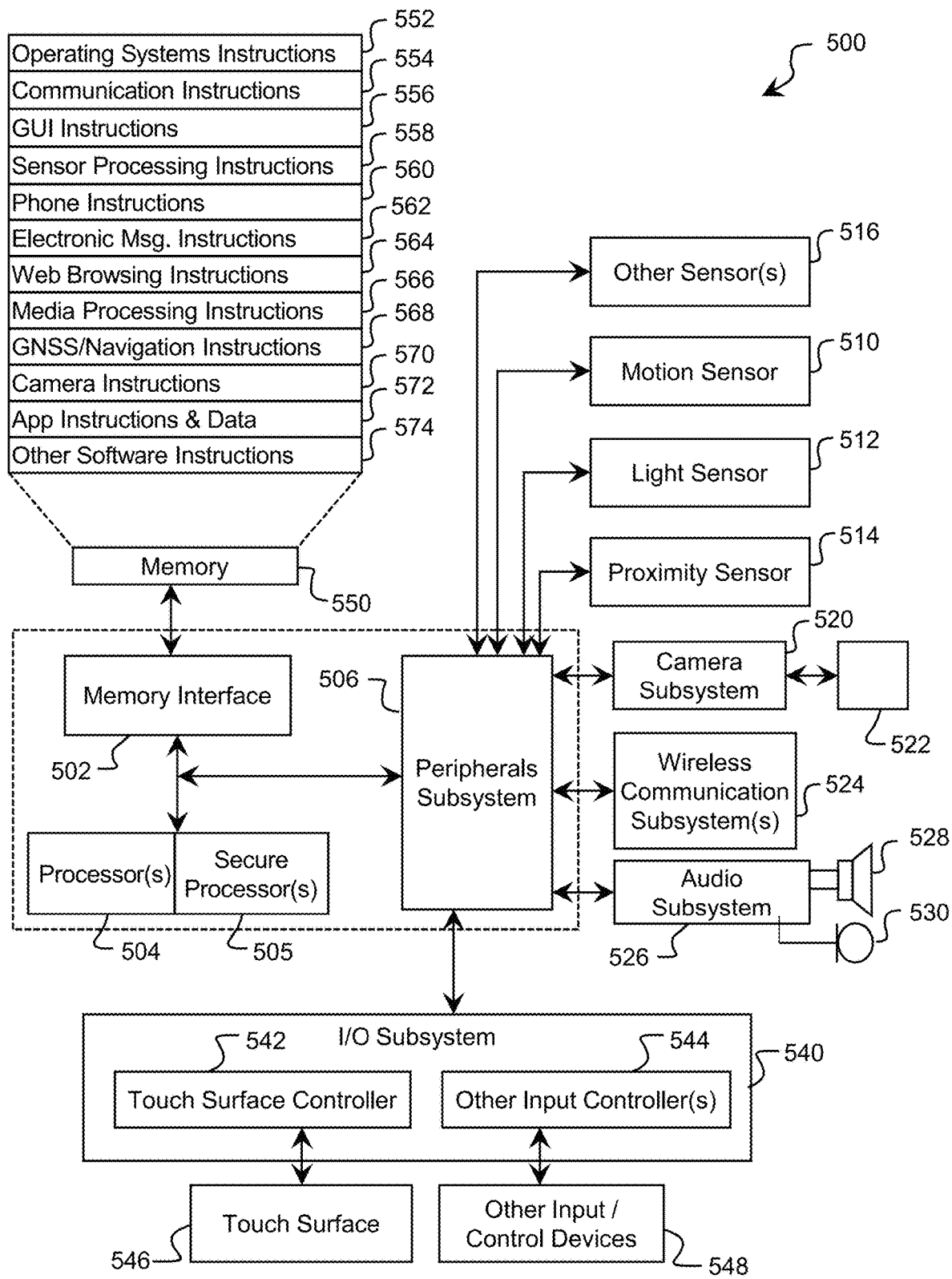
FIG. 5 is an example computing device that can be used within the system of FIG. 1 according to an embodiment of the present disclosure.

FIG. 5 is an example computing device that can be used within the system 100 of FIG. 1, according to an embodiment of the present disclosure. In some embodiments, device 500 can be user device 102. The illustrative user device 500 can include a memory interface 502, one or more data processors, image processors, central processing units 504, and or secure processing units 505, and peripherals subsystem 506. Memory interface 502, one or more central processing units 504 and or secure processing units 505, and or peripherals subsystem 506 can be separate components or can be integrated in one or more integrated circuits. The various components in user device 500 can be coupled by one or more communication buses or signal lines.

Sensors, devices, and subsystems can be coupled to peripherals subsystem 506 to facilitate multiple functionalities. For example, motion sensor 510, light sensor 512, and proximity sensor 514 can be coupled to peripherals subsystem 506 to facilitate orientation, lighting, and proximity functions. Other sensors 516 can also be connected to peripherals subsystem 506, such as a global navigation satellite system (GNSS) (e.g., GPS receiver), a temperature sensor, a biometric sensor, magnetometer, or other sensing device, to facilitate related functionalities.

Camera subsystem 520 and optical sensor 522, e.g., a charged coupled device (CCD) or a complementary metal-oxide semiconductor (CMOS) optical sensor, can be utilized to facilitate camera functions, such as recording photographs and video clips. Camera subsystem 520 and optical sensor 522 can be used to collect images of a user to be used during authentication of a user, e.g., by performing facial recognition analysis.

Communication functions can be facilitated through one or more wired and or wireless communication subsystems 524, which can include radio frequency receivers and transmitters and or optical (e.g., infrared) receivers and transmitters. For example, the Bluetooth (e.g., Bluetooth low energy (BTLE)) and or WiFi communications described herein can be handled by wireless communication subsystems 524. The specific design and implementation of communication subsystems 524 can depend on the communication network(s) over which the user device 500 is intended to operate. For example, user device 500 can include communication subsystems 524 designed to operate over a GSM network, a GPRS network, an EDGE network, a WiFi or WiMax network, and a Bluetooth™ network. For example, wireless communication subsystems 524 can include hosting protocols such that device 500 can be configured as a base station for other wireless devices and or to provide a WiFi service.

Audio subsystem 526 can be coupled to speaker 528 and microphone 530 to facilitate voice-enabled functions, such as speaker recognition, voice replication, digital recording, and telephony functions. Audio subsystem 526 can be configured to facilitate processing voice commands, voice-printing, and voice authentication, for example.

I/O subsystem 540 can include a touch-surface controller 542 and or other input controller(s) 544. Touch-surface controller 542 can be coupled to a touch-surface 546. Touch-surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 546.

The other input controller(s) 544 can be coupled to other input/control devices 548, such as one or more buttons, rocker switches, thumb-wheel, infrared port, USB port, and or a pointer device such as a stylus. The one or more buttons (not shown) can include an up/down button for volume control of speaker 528 and or microphone 530.

In some implementations, a pressing of the button for a first duration can disengage a lock of touch-surface 546; and a pressing of the button for a second duration that is longer than the first duration can turn power to user device 500 on or off. Pressing the button for a third duration can activate a voice control, or voice command, module that enables the user to speak commands into microphone 530 to cause the device to execute the spoken command. The user can customize a functionality of one or more of the buttons. Touch-surface 546 can, for example, also be used to implement virtual or soft buttons and or a keyboard.

In some implementations, user device 500 can present recorded audio and or video files, such as MP3, AAC, and MPEG files. In some implementations, user device 500 can include the functionality of an MP3 player, such as an iPod™. User device 500 can, therefore, include a 36-pin connector and or 8-pin connector that is compatible with the iPod. Other input/output and control devices can also be used.

Memory interface 502 can be coupled to memory 550. Memory 550 can include high-speed random access memory and or non-volatile memory, such as one or more magnetic disk storage devices, one or more optical storage devices, and or flash memory (e.g., NAND, NOR). Memory 550 can store an operating system 552, such as Darwin, RTXC, LINUX, UNIX, OS X, Windows, or an embedded operating system such as VxWorks.

Operating system 552 can include instructions for handling basic system services and for performing hardware dependent tasks. In some implementations, operating system 552 can be a kernel (e.g., UNIX kernel). In some implementations, operating system 552 can include instructions for performing voice authentication.

Memory 550 can also store communication instructions 554 to facilitate communicating with one or more additional devices, one or more computers and or one or more servers. Memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic messaging-related process and functions; web browsing instructions 564 to facilitate web browsing-related processes and functions; media processing instructions 566 to facilitate media processing-related functions and processes; GNSS/Navigation instructions 568 to facilitate GNSS and navigation-related processes and instructions; and or camera instructions 570 to facilitate camera-related processes and functions.

Memory 550 can store application (or "app") instructions and data 572, such as instructions for the apps described above in the context of FIGS. 1-3. Memory 550 can also store other software instructions 574 for various other software applications in place on device 400. The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computing system comprising:
   a processor; and
   a non-transitory computer-readable storage device storing computer-executable instructions, the instructions operable to cause the processor to perform operations comprising:
      receiving a user query from a user device;
      collecting historical data for a user associated with the user query;
      formatting the historical data and the user query as an input prompt;
      feeding the input prompt to a large language model (LLM);
      generating one or more tuning parameters via the LLM by analyzing the input prompt;
      updating a user profile of the user based on the one or more tuning parameters;
      identifying one or more matching user queries based on the received user query;
      generating, via a prediction engine, one or more personalized recommendations in response to the user query;
      updating the input prompt with the one or more personalized recommendations;
      feeding the updated input prompt to the LLM;
      generating, via the LLM, one or more final responses to the user query by analyzing the updated input prompt; and
      causing the one or more final responses to be displayed on the user device.

2. The computing system of claim 1, wherein collecting the historical data for the user comprises collecting at least one of one or more past queries from the user, a plurality of interaction data for the user, or feedback data for the user.

3. The computing system of claim 1, wherein collecting the historical data for the user comprises collecting the user profile of the user, the user profile comprising a knowledge graph.

4. The computing system of claim 1, wherein generating the one or more tuning parameters via the LLM comprises generating one or more of an inferred preference, an inferred expertise area, a query pattern, or a resource use pattern.

5. The computing system of claim 1, wherein identifying the one or more matching user queries based on the received user query comprises performing a hybrid semantic search on a database.

6. The computing system of claim 1, wherein generating the one or more personalized recommendations in response to the user query comprises:
   identifying one or more similar users to the user;
   constructing a user-item interaction matrix for the user;
   decomposing the user-item interaction matrix; and
   calculating a predicted interaction of the user for an item.

7. The computing system of claim 1, wherein causing the one or more final responses to be displayed on the user device comprises at least one of:
   displaying a ranked list of resources;
   displaying a confidence score associated with each final response; or
   displaying an explanation why at least one final response was suggested.

8. The computing system of claim 1, wherein the operations comprise:

receiving interaction data for the one or more final responses;

causing a feedback option to be displayed on the user device;

receiving feedback data from the user; and retraining the prediction engine based on the interaction data and the feedback data.

9. The computing system of claim 8, wherein receiving the interaction data comprises receiving an indication of the user following a link, opening a document, or utilizing a code snippet from the one or more final responses.

10. The computing system of claim 8, wherein receiving the feedback data comprises receiving a selection of an upvote, a selection of a downvote, or textual feedback.

11. A computer-implemented method, performed by at least one processor, comprising:

receiving a user query from a user device;

collecting historical data for a user associated with the user query;

formatting the historical data and the user query as an input prompt;

feeding the input prompt to a large language model (LLM);

generating one or more tuning parameters via the LLM by analyzing the input prompt;

updating a user profile of the user based on the one or more tuning parameters;

identifying one or more matching user queries based on the received user query;

generating, via a prediction engine, one or more personalized recommendations in response to the user query;

updating the input prompt with the one or more personalized recommendations;

feeding the updated input prompt to the LLM;

generating, via the LLM, one or more final responses to the user query by analyzing the updated input prompt; and causing the one or more final responses to be displayed on the user device.

12. The computer-implemented method of claim 11, wherein collecting the historical data for the user comprises collecting at least one of one or more past queries from the user, a plurality of interaction data for the user, or feedback data for the user.

13. The computer-implemented method of claim 11, wherein collecting the historical data for the user comprises collecting the user profile of the user, the user profile comprising a knowledge graph.

14. The computer-implemented method of claim 11, wherein generating the one or more tuning parameters via the LLM comprises generating one or more of an inferred preference, an inferred expertise area, a query pattern, or a resource use pattern.

15. The computer-implemented method of claim 11, wherein identifying the one or more matching user queries based on the received user query comprises performing a hybrid semantic search on a database.

16. The computer-implemented method of claim 11, wherein generating the one or more personalized recommendations in response to the user query comprises:

identifying one or more similar users to the user;

constructing a user-item interaction matrix for the user;

decomposing the user-item interaction matrix; and calculating a predicted interaction of the user for an item.

17. The computer-implemented method of claim 11, wherein causing the one or more final responses to be displayed on the user device comprises at least one of:

displaying a ranked list of resources;

displaying a confidence score associated with each final response; or displaying an explanation why at least one final response was suggested.

18. The computer-implemented method of claim 11 comprising:

receiving interaction data for the one or more final responses;

causing a feedback option to be displayed on the user device;

receiving feedback data from the user; and retraining the prediction engine based on the interaction data and the feedback data.

19. The computer-implemented method of claim 18, wherein receiving the interaction data comprises receiving an indication of the user following a link, opening a document, or utilizing a code snippet from the one or more final responses.

20. The computer-implemented method of claim 18, wherein receiving the feedback data comprises receiving a selection of an upvote, a selection of a downvote, or textual feedback.

* * * * *